United States Patent [19]

Wagner

[11] Patent Number: 4,732,519
[45] Date of Patent: Mar. 22, 1988

[54] FASTENER ASSEMBLY WITH AXIAL PLAY

[75] Inventor: David P. Wagner, Geneva, Ill.

[73] Assignee: Illinois Tool Works Inc., Chicago, Ill.

[21] Appl. No.: 945,811

[22] Filed: Dec. 24, 1986

[51] Int. Cl.[4] .......................................... F16B 21/07
[52] U.S. Cl. ................................... 411/337; 403/14;
403/408.1; 411/353; 411/533; 411/999
[58] Field of Search ............... 411/337, 353, 112, 113,
411/999, 533, 542; 403/405.1, 408.1, 14

[56] References Cited

U.S. PATENT DOCUMENTS

| | | | |
|---|---|---|---|
| 2,132,636 | 10/1938 | Maahs | 411/542 X |
| 3,062,253 | 11/1962 | Millheiser | 411/353 |
| 3,502,130 | 3/1970 | Gulistan | 411/999 X |
| 3,556,570 | 8/1971 | Cosenza | 411/999 X |
| 3,869,219 | 3/1975 | Wilson et al. | 403/408.1 X |
| 4,174,008 | 11/1979 | Preziosi et al. | 411/353 |
| 4,193,434 | 3/1980 | Wagner | 411/154 |
| 4,238,165 | 12/1980 | Wagner | 411/378 X |
| 4,334,599 | 6/1982 | Ritsema et al. | 403/408.1 X |
| 4,348,140 | 9/1982 | Bergholz et al. | 411/112 X |
| 4,621,961 | 11/1986 | Gulistan | 411/999 X |

FOREIGN PATENT DOCUMENTS

| | | | |
|---|---|---|---|
| 2423517 | 11/1975 | Fed. Rep. of Germany | 411/337 |
| 1218206 | 1/1971 | United Kingdom | 403/405.1 |

*Primary Examiner*—Lloyd A. Gall
*Attorney, Agent, or Firm*—D. I. Roche; T. W. Buckman

[57] ABSTRACT

A fastener assembly adapted for use in connection with a first and second apertured workpiece, said fastener assembly comprising a fastener, washer and rubber grommet, said fastener having a head, and a shank; said shank including an upper shank portion, a lower threaded shank portion and a pair of wings spaced between said upper unthreaded shank portion and lower threaded shank portion; said washer and rubber grommet being telescopically associated with said fastener.

3 Claims, 6 Drawing Figures

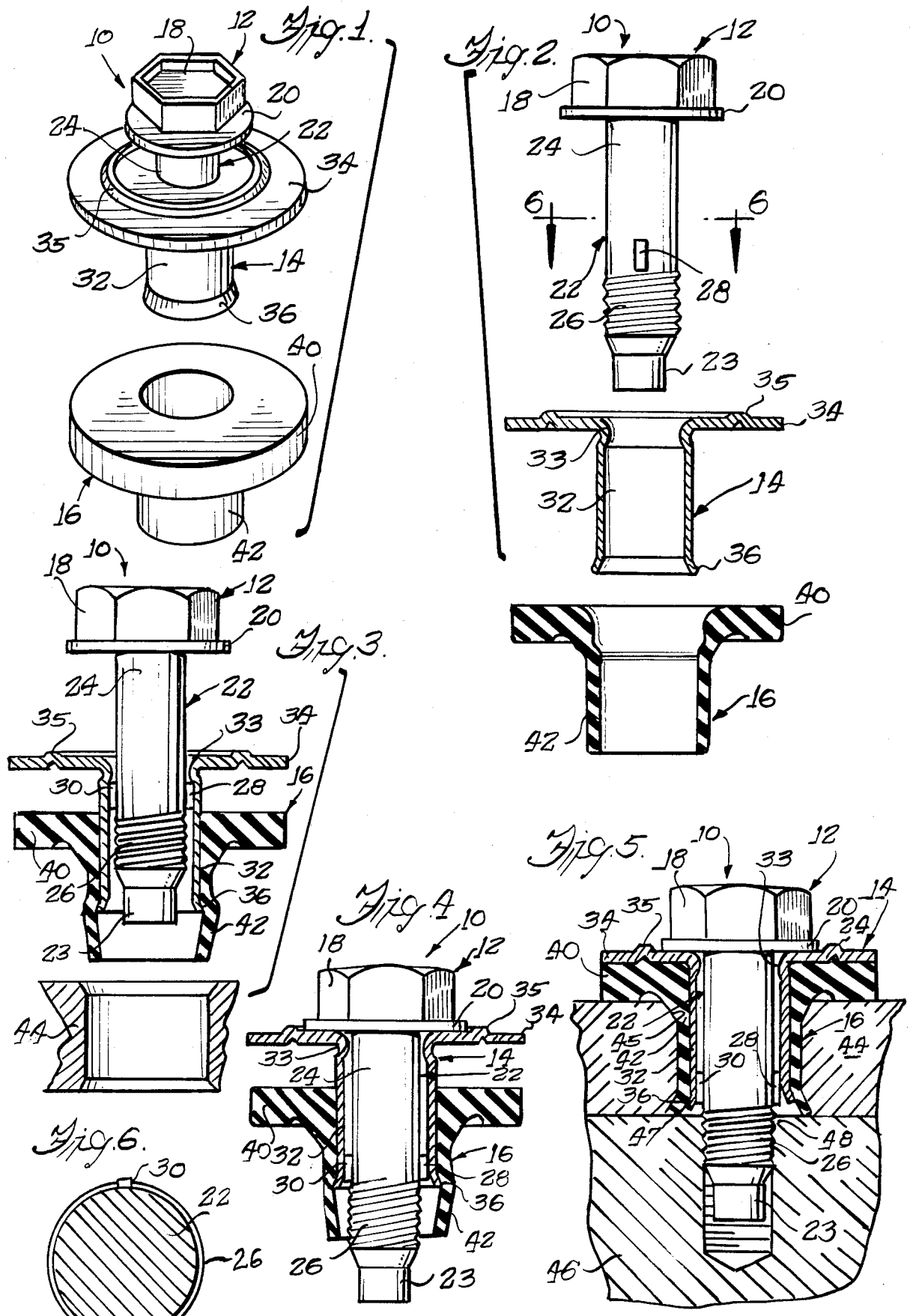

FASTENER ASSEMBLY WITH AXIAL PLAY

BACKGROUND OF THE INVENTION

This invention relates to a threaded fastener assembly and more particularly to a threaded fastener, washer and rubber grommet assembly which is to be preassembled with a first apertured workpiece such as a rocker arm cover which is to be mounted on a second apertured workpiece.

In prior art fastener units such as those shown by the inventions in U.S. Pat. Nos. 4,193,434; 4,292,007 and 4,238,165 the washer is attached to a fastener by means of an annular formation or enlarged section created during a thread rolling operation. It is difficult to form these enlarged sections in a fastener blank at locations other than adjacent to the screw head.

Although, the prior art fastener units provide reliable fasteners the location of the annular formation adjacent to the head of the fastener limits the amount of axial play between the fastener and the washer.

In some instances, significant axial play is required so that the preassembled fastener and first workpiece unit can be placed on a flat surface or second workpiece without the fastener projecting beyond the underside of the first workpiece.

Accordingly, it is an object of this invention to provide a preassembled fastener assembly which provides significant axial play between the fastener and washer.

It is a further object of this invention to provide a fastener assembly which can be preassembled with a first workpiece so that the preassembled unit can be placed on a flat surface or second workpiece without the fastener projecting beyond the underside of the first workpiece.

SUMMARY OF THE INVENTION

This invention contemplates a fastener unit comprising a preassembled threaded fastener, washer and rubber grommet adapted to be preassembled with a first apertured workpiece such as a rocker arm cover. The threaded fastener includes a head and shank. The shank includes an upper unthreaded shank portion of a predetermined axial extent and a lower threaded shank portion of a predetermined axial extent with a pair of forged wings formed at a predetermined point on the shank a substantial distance from the fastener head and located between the unthreaded shank portion and the threaded shank portion. The washer provides an axially extending sleeve of substantially uniform wall thickness and a predetermined axial extent and a rim portion extending laterally from the uppermost extremity of the sleeve of the washer. The sleeve includes a flared portion at its lower extremity. The inner periphery of the sleeve is of a diameter greater than the diameter of the unthreaded shank portion and the threaded shank portion allowing substantial axial play between the fastener and the washer. The inner diameter of the rim of the washer is adapted to snap over the wings formed on the shank, thereby holding the washer in assembled relationship with the fastener. The rubber grommet includes an axially extending sleeve of substantially uniform wall thickness and a predetermined axial extent and a rim portion extending laterally from the uppermost extremity of the sleeve of the grommet. The rubber grommet is adapted to stretch over the washer, holding the rubber grommet in telescopic relationship with the washer. The three piece fastener assembly can be secured to an apertured first workpiece so that the fastener does not project past the underside of the first workpiece.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is an enlarged partially exploded perspective view of the fastener assembly of the invention;

FIG. 2 is an exploded side elevational view, partially in cross-section, of the fastener assembly unassembled;

FIG. 3 is a side partial sectional view of the preassembled fastener assembly;

FIG. 4 is a side partial sectional view of the preassembled fastener assembly in a partially assembled condition;

FIG. 5 is a side partial sectional view of the preassembled fastener assembly in engagement with first and second workpieces; and FIG. 6 is a sectional view of the screw taken along line 6—6 of FIG. 2.

DETAILED DESCRIPTION OF THE INVENTION

Turning now to the drawings wherein like reference numerals describe like elements, there is shown best in FIG. 2, an exploded view of the fastener assembly 10 comprising a fastener 12, washer 14 and a grommet 16 made of rubber or other suitable elastic material. The fastener 12 comprises a head 18 and a clamping surface 20 located thereunder, a shank 22, and an entering end portion 23.

As shown in FIG. 2, the shank 22 has an upper unthreaded shank portion 24 of a predetermined axial extent located directly under the clamping surface 20 and a lower threaded shank portion 26. As shown best in FIGS. 3, 4 and 5 the shank 22 includes one or more annularly discrete protuberances or wings 28 and 30, forged into the shank 22. Preferably a pair of these wings is provided with the wings being substantially 180 degrees apart. The wings 28 and 30 are forged in the shank 22 at a predetermined point a substantial distance from the head 18 and located between the upper unthreaded shank portion 24 and the lower threaded shank portion 26.

The washer 14 as shown in FIGS. 1-5, includes an axially extending tubular sleeve 32 with a wall of uniform thickness and a rim or flange 34 radially extending from a slightly inwardly projecting annular bead portion 33 at the uppermost extremity of the sleeve 32. The rim 34 includes a raised annular abutment 35 as shown in FIGS. 1-5. The sleeve also includes a flared rim 36 at its lower extremity. As shown in FIG. 5, in final assembly, the flange 34 of the washer 14 is flush against the clamping surface 20, so that the clamping surface 20 rests within the perimeter of the raised abutment 35.

The inner diameter of the washer 14 is slightly greater than the annular bead portion 33 of the flange and the diameter of a circle defined by the wings 28 and 30 located on the shank 22. As shown in FIGS. 1, 3, 4 and 5 the washer 14 is preassembled with the fastener 12 by telescopically associating one with the other and snappingly forcing the annular bead portion 33 of washer 14 over the wings 28 and 30 to secure the washer 14 to the fastener 12. The inner diameter of the washer 14 is greater than the diameter of the unthreaded shank portion 24 and the threaded shank portion 26 which allows substantial axial play between the washer 14 and the fastener 12. The diameter of the threaded shank portion 26 is less than the diameter of the wings 28 and 30.

The location of the wings 28 and 30 on the shank portion 22 of the fastener 12 allows for restricted float between the fastener 12 and the washer 14 parallel to the fastener axis. This location and the forging technique for forming the wings or protuberances also permits the use of a simplified screw blank without shoulders which makes it easier to head and thread roll the fastener. The axial play is required so that the first workpiece or rocker arm cover 44 can be preassembled with the fastener assembly 10 and then placed on a flat surface or second apertured workpiece 46 without the fastener 12 projecting beyond the underside of the rocker arm cover 44. This is important so that the fastener assembly and first workpiece 44 can be preassembled and then placed on a second workpiece 46 until the fastener is aligned with the threaded aperture 48 in the second workpiece. In addition, the use of discrete protuberances or wings provide for increased lateral play of the head of the fastener and/or relative tilting between the screw and the grommet for facilitating alignment of the screw with the aperture in a second workpiece, particularly in assemblies involving a plurality of the fasteners. This greatly facilitates the assembly of the first and second workpieces together.

The rubber or elastic grommet 16 comprises an annular flange or rim 40 and a radial extending tubular sleeve 42. The tubular sleeve 42 is adapted to stretch over the tubular sleeve 34 of the washer 14 so that the grommet 16 fits snuggly and securely over the tubular sleeve 32 of the washer 14.

The preferred method of assembly is shown in FIGS. 3 and 4, the fastener 12, washer 14, and grommet 16 are preassembled together so that the flange or rim 40 of the grommet 16 is positioned below the rim 34 of the washer 14. The three piece fastener assembly is then placed into aperture 45 of the first workpiece or rocker arm cover 44 so that the rim 40 of the grommet 16 is flush against the rim 34 of the washer 14. The grommet 16 stretches around the flared rim 36 of the washer sleeve 32. The flared rim 36 is adapted to fit securely in the notched portion 47 of the first workpiece 44, thereby holding the fastener assembly 10 in relationship with the first workpiece 44.

In an alternative method of assembly, not shown, the grommet 16 is placed in the first workpiece or rocker arm cover 44 and the washer 14 is pushed into the rubber grommet. The fastener 12 is then inserted into the washer 14 by applying pressure to the head 18 of the fastener 12. The wings 28 and 30 on the shank portion 22 of the fastener 12 snap past the smaller inner diameter of the washer 14.

The fastener assembly 10 and first workpiece 44 are then ready for final assembly with a second workpiece 46. In final assembly one or more of the preassembled fastener assemblies 10 and first workpiece 44 can be placed on top of a relatively flat second workpiece without the fastener 12 projecting beyond the first workpiece 44 and interfering with easy alignment of the workpieces. As shown best in FIG. 5, when the fastener 12 is aligned with the threaded aperture 48 in the second workpiece 46, the fastener 12 drops underneath the first workpiece 44 into the threaded aperture 48 to secure the first and second workpieces together.

In the fully tightened position (not shown), the fastener 12 is threadingly advanced into the second workpiece 46 so that the flaired rim 36 of the sleeve 32 contacts the upper surface of the second workpiece, and so that the flange 40 of the rubber grommet 16 is partially compressed. In order to achieve proper compression of the flange 40, the length of the sleeve 32 must be slightly less than the total combined thicknesses of the flange 40 and the rocker arm cover 44.

Also, it should be noted that the upper shank portion of the screw, shown unthreaded in the drawings, may be provided with the threads, rings, knurlings or the like to limit or reduce the amount of tilting of the fastener relative to the washer.

While a particular embodiment of the invention has been shown and described, it will be obvious to those skilled in the art that changes and modifications of the present invention, in its various aspects, may be made without departing from the invention in its broader aspects. As such, the scope of the invention should not be limited by the particular embodiment and specific construction described herein but should be defined by the appended claims and equivalents thereof.

The invention is claimed as follows:

1. A fastener assembly adapted for use in connection with first and second apertured workpieces, said fastener assembly comprising a fastener, a washer and a rubber grommet, the fastener having a head with a clamping surface thereunder, a shank and a reduced diameter entering portion; said shank having an upper shank portion of a predetermined axial extent, a lower threaded shank portion of a predetermined axial extent and a pair of integrally formed wings spaced a predetermined axial distance from the head of the fastener between said upper shank portion and said lower threaded shank portion; said washer including a radial flange and an axially extending sleeve and a rim extending laterally from the uppermost extremity of the sleeve and a flared portion extending outwardly from the lowermost extremity of the sleeve; said washer being telescopically associated with said fastener, the inner diameter of said rim of said washer being adapted to snap over the pair of wings securing the washer and the fastener together; the inner diameter of the sleeve of the washer being greater than the diameter of said upper shank portion and said lower threaded shank portion allowing substantial axial play between said washer and said fastener; said rubber grommet having an axially extending sleeve and a rim extending laterally from the uppermost extremity of said sleeve of said rubber grommet, said rubber grommet telescopically stretching over said washer, said wings being spaced from said entering portion such that said entering portion does not substantially project beyond a free end of the sleeve of said rubber grommet when said wings abut said rim, and said wings lying directly adjacent said threaded portion and spaced the substantial length of the upper shank portion from said head to provide for substantial axial play of the fastener in the washer.

2. A fastener assembly according to claim 1 wherein the sleeve of said washer is of substantially uniform wall thickness.

3. A fastener assembly according to claim 1 wherein the sleeve of said rubber grommet is of substantially uniform wall thickness.

* * * * *